Figure 1:
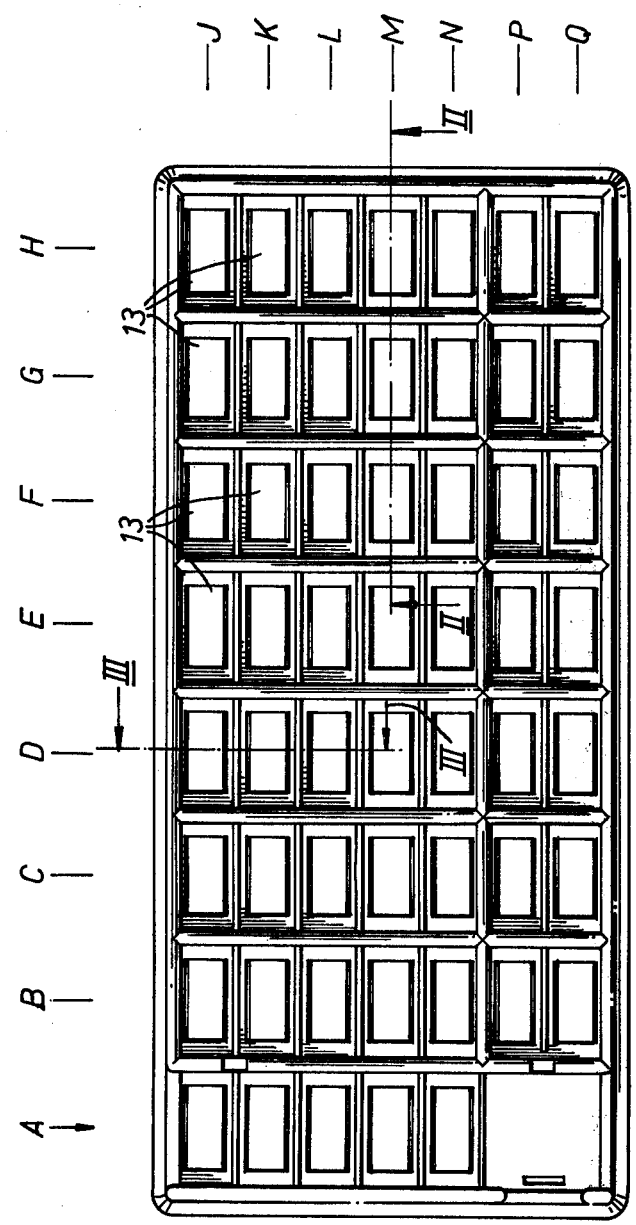

United States Patent [19]

Pullman

[11] 4,134,592
[45] Jan. 16, 1979

[54] APPARATUS FOR PLAYING GAMES

[76] Inventor: Burke C. Pullman, 14, St. Leonard's Ter., London, S.W.3., England

[21] Appl. No.: 750,146

[22] Filed: Dec. 13, 1976

[30] Foreign Application Priority Data

Dec. 11, 1975 [GB] United Kingdom ............... 50931/75
Jun. 12, 1976 [GB] United Kingdom ............... 24443/76

[51] Int. Cl.² .............................................. A63F 3/00
[52] U.S. Cl. ................................... 273/281; 273/287; 273/240; 40/504; 116/222
[58] Field of Search ........... 273/130 B, 136 C, 130 D, 273/136 E, 136 F, 148 R, 143 R, 143 A, 143 C, 143 E, 143 D; 40/77.4, 77.6, 19, 111, 114; 35/77, 28; 116/133, 134, 129 G, 129 H, 130; 235/114, 131 FD, 131 JA, 1 C; 29/743, 744

[56] References Cited

U.S. PATENT DOCUMENTS

| | | | |
|---|---|---|---|
| 687,487 | 11/1901 | Powell | 273/136 F |
| 1,553,100 | 9/1925 | Olsen | 235/131 FD |
| 2,236,132 | 3/1941 | Braidwood | 116/133 |
| 2,279,836 | 4/1942 | McMullin | 40/77.6 |
| 2,483,878 | 10/1949 | Charest | 273/143 R |
| 2,599,111 | 6/1952 | Kicher | 40/19 |
| 2,782,539 | 2/1957 | Baker | 40/111 |
| 2,844,893 | 7/1958 | Keller | 40/310 |
| 2,856,714 | 10/1958 | Bruner | 40/77.4 |
| 2,984,035 | 5/1961 | Nalle | 40/324 |
| 3,128,100 | 4/1964 | Sinden | 273/143 D |
| 3,169,331 | 2/1965 | Herster | 40/77.6 |
| 3,365,820 | 1/1968 | Connell | 35/77 |
| 3,410,011 | 11/1968 | Bowman | 40/77.6 |
| 3,667,103 | 6/1972 | Petree | 29/743 |
| 3,776,177 | 12/1973 | Bryant et al. | 116/133 |
| 3,797,829 | 3/1974 | Heller | 273/130 B |
| 4,022,473 | 5/1977 | Foley | 273/136 C |
| 4,026,043 | 5/1977 | Caruso | 35/77 |

FOREIGN PATENT DOCUMENTS

| | | | |
|---|---|---|---|
| 374474 | 4/1923 | Fed. Rep. of Germany | 273/136 F |
| 857292 | 11/1952 | Fed. Rep. of Germany | 235/1.3 |
| 50296 | 10/1939 | France | 273/143 R |

OTHER PUBLICATIONS

"And Now, Master Mind", Time Magazine, Dec. 1, 1975, p. 73.

*Primary Examiner*—Robert W. Michell
*Assistant Examiner*—Arthur S. Rose
*Attorney, Agent, or Firm*—Young & Thompson

[57] ABSTRACT

Apparatus for playing a game comprising a base or body formed with large numbers of small apertures or windows (13), and means for displaying selected visible markings in the various windows. In one example there are a number of rotatable elements (12,44,41) located in the case, one below each window, each body having a plurality of different characters or symbols, so that by turning the bodies selected markings are displayed at the different windows. The apparatus may include a cover to conceal some of the windows and special groups of rotary indicates (P+Q) to indicate scores achieved in the game. The indicators may be tubular (28) or spherical (44) or may have cassette type printed strips (40). Alternatively the apparatus may include a writing surface (49,50,51) in each window, and an eraser (52) to erase any writing.

1 Claim, 11 Drawing Figures

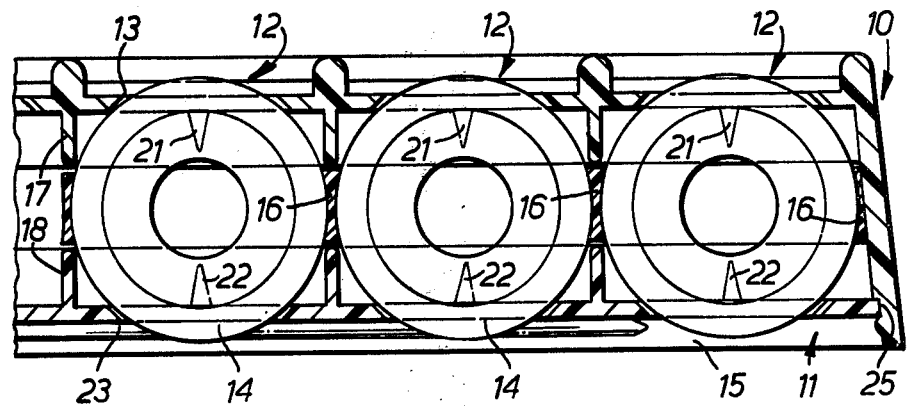
FIG.2.
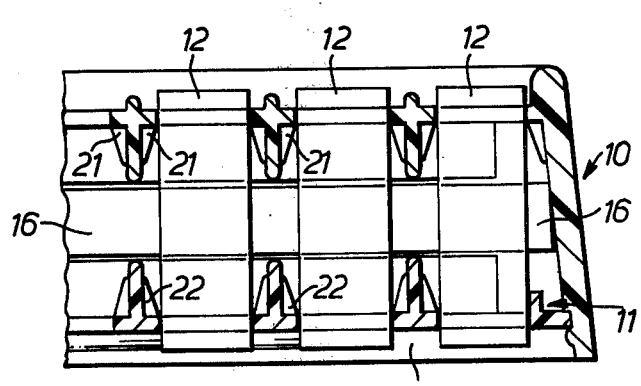
FIG.3.
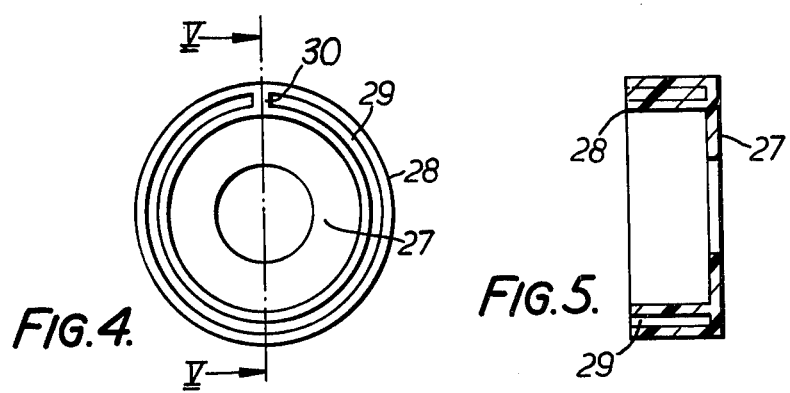
FIG.4.
FIG.5.

U.S. Patent  Jan. 16, 1979  Sheet 3 of 3  4,134,592

1

APPARATUS FOR PLAYING GAMES

This invention relates to apparatus for educational or amusement purposes and is intended primarily for use in playing games which are normally played on a board by moving pieces or counters from one position to another on the board. However, the invention may also be applied to other forms of game, for instance games such as jigsaw puzzles or writing or drawing games.

In conventional board games such as chess, the equipment includes a board marked out with large numbers of positions for the playing pieces and in playing the game the pieces are physically moved about the board according to the rules.

From one aspect the present invention is based on the concept that the playing pieces are not physically moved about the board but means are provided for displaying a selected symbol or character representing one of the pieces at any selected station on the board.

Thus broadly stated the invention consists in apparatus for playing a board game comprising a base carrying markings providing a large number of individual positions for playing pieces in the game, an aperture or window at each position and a movable element associated with each position and carrying two or more different symbols, characters or the like and movable manually into one or more positions to display a selected symbol or character.

Preferably each movable element is mounted for rotary or pivotal movement, and is in the form of a transparent drum, and the symbols or characters are mounted on a strip located within the periphery of the drum so as to be visible through the transparent drum wall.

As mentioned above, the invention can readily be applied to board games such as chess or chequers (draughts), but the invention is also applicable to a game involving guessing or analysis in which one player selects a group of letters or symbols and another player attempts to guess the correct group by trial and error.

Thus, in many forms of the invention the base will be provided with apertures or windows in aligned rows extending in two perpendicular directions.

In a particular preferred form of the invention for use in playing a guessing or analysis game, some of the rows of apertures or windows are associated with movable elements carrying groups of characters or symbols to be selected, and other rows are associated with movable elements carrying markings indicating the score achieved, or the relative success of the selected group. Preferably also the apparatus will include means for concealing or shielding from view one of the rows of apertures or windows.

According to a particular preferred feature of the invention the apparatus includes a friction damper or a detent associated with each movable element to prevent accidental movement thereof. For example, these dampers may be in the form of foamed or cellular synthetic plastic strips having resilient and frictional properties.

The invention also lies in the movable element or indicator itself, and from another aspect consists in a rotary dial, sleeve, as defined above, comprising a tubular body having a peripheral transparent wall or window, and means for mounting a printed strip bearing a series of letters, numerals, symbols, or characters, displayed through the said transparent wall or window.

Furthermore, from a further aspect the invention consists in apparatus for playing a game comprising a base providing a large number of individual apertures or windows, a writing surface in each aperture or window, and means for erasing any writing from the surfaces.

Figure 6:
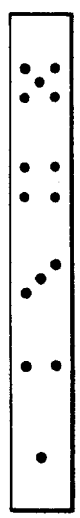
Figure 7:
Figure 8:
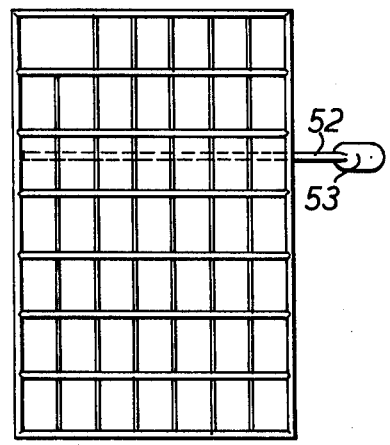
Figure 9:
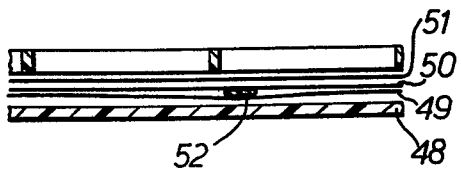
Figure 10:
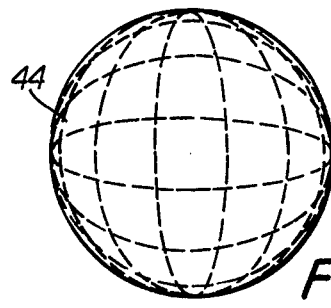
Figure 11:
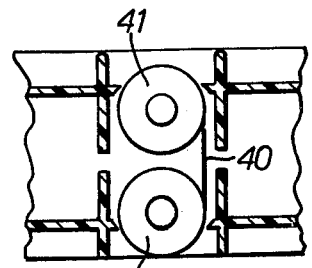

The invention may be described in various ways and two specific embodiments with a number of possible modifications will now be described, by way of example, with reference to the accompanying drawings in which:

FIG. 1 is a plan view of an amusement apparatus according to the invention for playing a game, FIG. 2 is a fragmentary sectional side elevation on an enlarged scale on the line II — II in FIG. 1, FIG. 3 is a fragmentary sectional end elevation on the line III — III in FIG. 1, FIG. 4 is an end view on an enlarged scale illustrating one of the rotary dials, FIG. 5 is a sectional view through the dial on the line V — V in FIG. 4, FIGS. 6 and 7 are illustrations of two sample printed slips which may be fitted in the rotary dials, FIG. 8 is a plan view of an alternative form of amusement apparatus according to the invention, FIG. 9 is a somewhat diagrammatic fragmentary side elevation on an enlarged scale and partly in section of the apparatus illustrated in FIG. 8, FIG. 10 is a perspective view of a spherical indicator which may be incorporated in a machine in place of the cylindrical dial illustrated in FIGS. 4 and 5, and FIG. 11 is a diagrammatic sectional side elevation illustrating a further cassette tape type of display device.

The apparatus illustrated in FIGS. 1 to 7, is intended for use in playing a game which relies on a combination of guesswork or "hit or miss" technique, combined with careful analysis and some mental dexterity. Essentially one player selects a group of symbols, numbers or characters, and the other player makes a series of random or calculated guesses, while the first player indicates or scores the partial successes of each attempt.

In the apparatus illustrated in FIG. 1, it will be noticed that the unit provides a first row A of five windows, and seven further rows B to H, each having seven windows. The same windows are aligned in five banks J to N, with two further banks PQ. The apparatus includes means for displaying selected characters or symbols in the windows, as will be explained below, and the game is played by a first player selecting five symbols to appear in the row A, these being then covered by a hinged flap (not illustrated) so as to be invisible to the second player. The second player then selects at random five symbols in the first row H, and the first player indicates the correctness or otherwise of this choice by a display of suitable scoring symbols in lines P and Q. The second player then continues with further trial rows G,F,E etc. and in each case the first player indicates the score in lines P and Q.

In this particular embodiment the apparatus comprises two main components of the case, an upper element 10 and a lower element 11, with a plurality of cylindrical rotary dials 12 located between the two components so as to be visible through the windows 13. As shown in FIGS. 2 and 3, each of the dials 12 projects somewhat through the respective window 13, and part of the dial also projects through a corresponding aperture 14 in the lower casing component 11, though it is held out of contact with a table top or other supporting surface by the lower edge or skirt 15 of the case. It will, therefore, be seen that the upper and lower surfaces of each dial are accessible and the dial can be readily turned in either direction by finger and thumb.

The dials are prevented from accidental rotation by means of "damping" friction strips 16, which extend across the full width of the apparatus between each of the rows A to H and are in firm contact with all the rotary dials on each row. These friction strips are located between strengthening ribs 17 in the upper component 10, and corresponding strengthening ribs 18 on the lower component 11. The strips are formed of a felted fibrous material, or a foamed synthetic plastics material, conveniently being impregnated or formed of a polymer which will provide smooth frictional engagement with the dials allowing controlled rotation, but preventing unwanted accidental movement. A particular preferred material is that known as PLASTAZOTE a foamed cross-linked polyethylene manufactured by Bakelite Xylonite Limited.

There is a total of 54 rotary dials in the apparatus and the assembly of these dials is an important factor in the cost of the equipment. To ease assembly, both the upper and lower components 10,11 are provided with inclined "lead in" tapered ribs 21,22 clearly seen in FIGS. 2 and 3. It will be apparent that these inclined ribs provide automatic centralising of each dial within the respective window, and it will be noted that the edges or lips of each window, as seen in FIG. 2, are also sloping to fit the peripheral surface of each dial. It is, therefore, comparatively simple to locate all 54 dials in one or other of the components 10,11 and then to place the other component in position over the dials. The two components then snap together by engagement of the lower panel 11 in a groove 25 formed in the peripheral wall of the upper component.

Each of the rotary dials is formed as a synthetic plastics moulding and comprises an end wall 27 joined to a transparent cylindrical wall 28, provided with a cylindrical groove or slot 29 interrupted at one position 30. Within this slot is located a printed strip, as illustrated in FIG. 7, carrying seven symbols such as a fish, animal, yacht etc. Dials with these symbols are positioned in each of the rows A to H on the lines J to N. In the two remaining lines P and Q the dials are provided with scoring strips of the type illustrated in FIG. 6. Each of these strips has six divisions with marks ranging from 5 to 0. The maximum value 5 here relates to the total number of windows 13 in any one row A to H. If there are more or less than five windows in each row, the maximum scoring number in the strip of FIG. 6 will be altered accordingly. It will be understood that the interruption or bridge 30 in each rotary dial prevents the strip from moving, and the symbols or scoring numbers are visible through the transparent plastic wall 28.

The game thus resembles to some extent a so-called "fruit machine" or one armed bandit. By varying the symbols on the strips, however, the rules and appearance of the game can be fundamentally altered. For example, the strips in lines J to N may carry letters, numbers, coloured markings or any other desired characters or symbols.

If using letters of the alphabet it may be desired to have all 26 possible letters available at each window. For this purpose, the letters may be printed on a strip 40 which runs as a continuous belt over upper and lower pulleys 41,42 in the manner of a tape cassette, as illustrated in FIG. 9. Another possible modification involves the use of spherical bodies 44, as illustrated in FIG. 10, each provided with a plurality of divisions over its whole surface and each division provided with an appropriate character or symbol to be displayed through the respective window.

With some slight modification of the dimensions and design of the apparatus, the unit may be designed to provide means for playing a game of chess, in which there will be 64 windows, each with a sphere or rotary dial below, and each rotary element carrying a selection of all the possible chess pieces. Thus, by rotating the dials appropriately all possible movements in the game are available.

Another possible use of the invention is to play jigsaw puzzles, in which each indicator carries a large number of possible jigsaw "pieces" which then are selected accordingly to fit with adjacent pieces.

Another embodiment of the invention is illustrated in FIGS. 8 and 9, making use of a so-called "magic writing pad". In this embodiment the upper part of the unit is formed to provide 54 windows arranged in lines and rows in the same manner as FIG. 1, but instead of the rotary dials or indicators a special type of writing surface is provided below each window. This consists of a base supporting surface 48, over which is a layer 49 of a dark waxy material, covered by a further layer 50 of a semi-transparent or translucent paper or synthetic plastics material, resembling greaseproof paper. Over the layer 50 is a further thin flexible transparent layer of plastics 54, and between the two layers 50,49 is a movable earsing bar 52 attached to a handle 53 at the side of the instrument. By using a pointed scriber to press on the surface 51, the translucent layer 50 is pressed down on the the dark waxy layer 49 and these inscribed marks are then visible through the respective window. By moving the eraser bar 52 between the layers 50 and 49 this writing is "erased". In this way a game can be played by filling in random choices in the succssive spaces and at the end of the game all the marks can be erased.

I claim:

1. Apparatus for playing a game comprising a base, including front and rear housing members secured together by resilient snap-fit formations on said members, one of said members being formed to provide in conjunction with the other member a plurality of individual pockets, each associated with a window in the front housing member and an access opening in the rear housing member, an individual rotary playing drum located one in each of said pockets, to be visible through the respective front windows, and also accessible through the respective rear opening, each said playing drum having a transparent peripheral wall and a printed strip carrying a plurality of different symbols located within and protected by said peripheral wall, said pockets being formed such that they mate with the peripheral surface of each said drum, said peripheral surface forming the sole bearing surface for each said drum, and including a friction damping element located in said base between said housing members, and engaging a plurality of said drums, to prevent accidental rotation thereof, and in which at least one of said housing members is formed with inclined lead-in guide surfaces extending into the interior of the housing at each of said pockets, to assist in locating each drum in the respective pocket during assembly.

* * * * *